(12) United States Patent
Wenzel

(10) Patent No.: US 6,513,119 B1
(45) Date of Patent: Jan. 28, 2003

(54) ACCESS SECURITY SYSTEM

(76) Inventor: Terry Wenzel, 3754 12th St. North, Naples, FL (US) 34103

( * ) Notice: Subject to any disclaimer, the term of this patent is extended or adjusted under 35 U.S.C. 154(b) by 0 days.

(21) Appl. No.: 09/233,202

(22) Filed: Jan. 20, 1999

Related U.S. Application Data

(60) Provisional application No. 60/071,851, filed on Jan. 20, 1998.

(51) Int. Cl.[7] .............................. H04L 9/32; G06F 11/30
(52) U.S. Cl. ........................ 713/200; 713/201; 340/715; 340/505; 340/541; 340/147; 340/149; 340/825.33
(58) Field of Search ................................ 713/200, 201; 340/825.33, 825.31, 715, 505, 506, 541, 147, 149

(56) References Cited

U.S. PATENT DOCUMENTS

| | | | | |
|---|---|---|---|---|
| 3,701,100 A | * | 10/1972 | Yarbrough ............. 340/825.31 |
| 4,023,139 A | * | 5/1977 | Samburg ................. 340/506 |
| 5,276,444 A | * | 1/1994 | McNair ................ 340/825.33 |
| 5,592,377 A | * | 1/1997 | Lipkin ........................ 705/42 |
| 5,774,569 A | * | 6/1998 | Waldenmaier .............. 348/143 |
| 5,921,523 A | * | 7/1999 | South et al. ................ 348/551 |
| 5,991,429 A | * | 11/1999 | Coffin et al. ................ 382/118 |

* cited by examiner

*Primary Examiner*—Ly V. Hua
(74) *Attorney, Agent, or Firm*—Oblon, Spivak, McClelland, Maier & Neustadt, P.C.

(57) ABSTRACT

A security access system can replace a physical guard with a kiosk including video cameras, monitors, microphones, control equipment, etc. and the like, so that one central monitoring station can control a plurality of automated remote kiosks. The central station can view and communicate with a visitor at each of the kiosks. The central station also has access to databases to determine whether the visitor should be granted access. Moreover, video data of the visitor can be recorded at the central station. This central station can then grant or deny access to the visitor. Low costs and highly efficient operations are thereby realized.

5 Claims, 1 Drawing Sheet

ACCESS SECURITY SYSTEM

CROSS-REFERENCE TO RELATED APPLICATION

This regular application is derived from U.S. Provisional Patent Application Ser. No. 60/071,851 filed on Jan. 20, 1998.

BACKGROUND OF THE INVENTION

1. Field of the Invention

The present invention is directed to an access security system, and in particular to such systems for controlling access to gated communities.

2. Description of the Related Art

It has been a conventional practice to provide a guard at an entrance to a gated community to control the entrance of residents and guests. However, such a guarded community entrance system suffers from several drawbacks.

First, such a system is often very expensive to operate because the cost of maintaining a guard at all entrances to a gated community can be very high. Furthermore, the security of such a gated community is dependent on the work attitude and reliability of the guards. Because security guards are paid relatively low salaries, turnover and absenteeism are high and continuity of high performance standards is rare. Thus, the overall quality of any guard-based, access control system is limited by the performance of its weakest guard personnel.

SUMMARY OF THE INVENTION

Accordingly, one object of the present invention is to provide a novel access security system in a gated community in order to overcome the drawbacks in conventionally guarded communities.

A more specific objective of the present invention is to provide a novel access security system for a gated community in which guards are no longer needed so that a low cost and efficient operation can be achieved.

A further feature of the present invention is to provide enhanced features at an entrance to a gated community, such as visual monitoring, storing of monitored data, and the like.

DETAILED DESCRIPTION OF THE PREFERRED EMBODIMENTS

Figure 1:
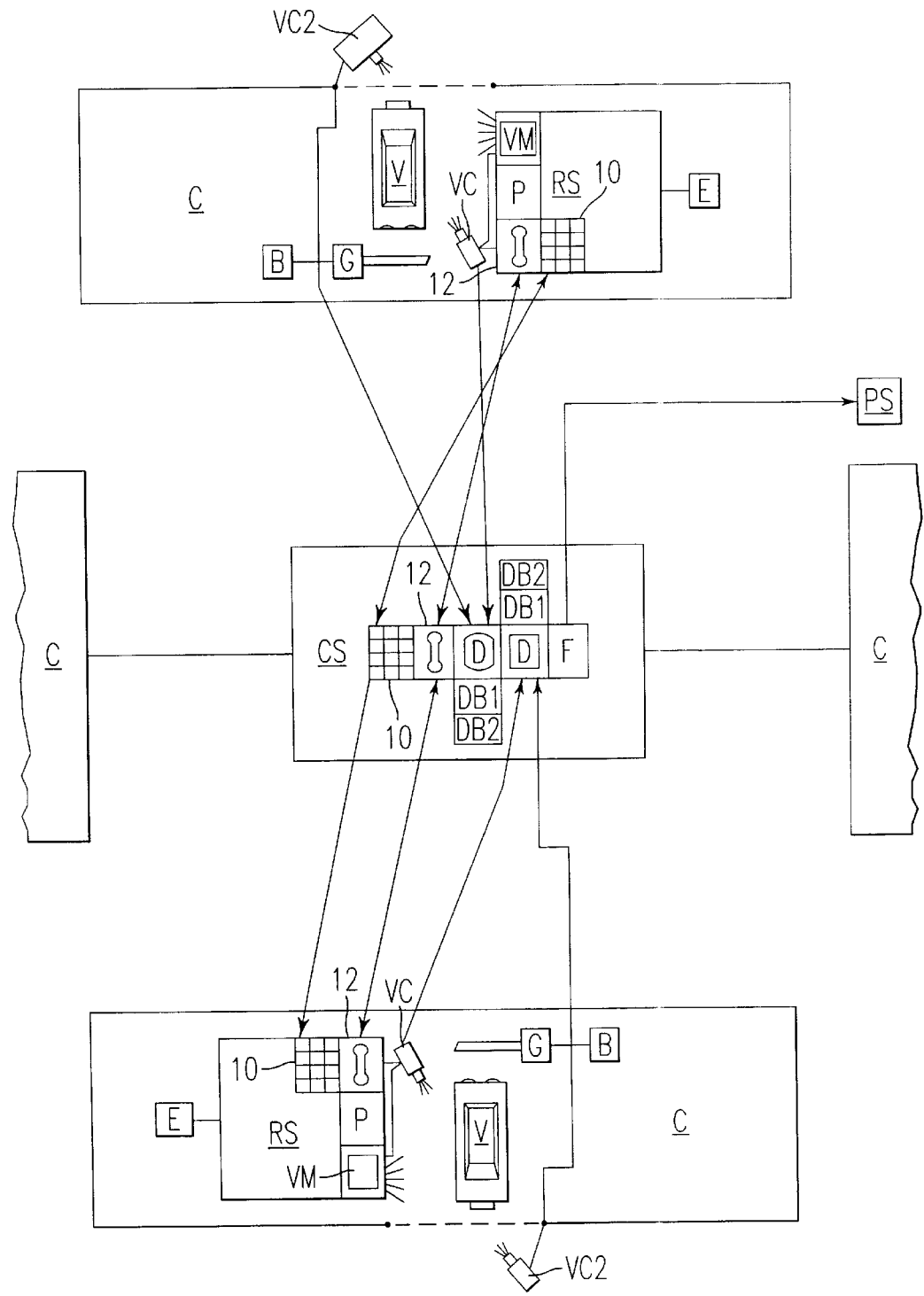
FIG. 1 is a schematic representation of one embodiment of an access security system of the present invention.

In FIG. 1, an access security system has at least one remote station RS for controlling access past a gate G for a gated community C. A central station CS monitors the remote stations RS and controls access past each remote station RS. Dial-up and cable modem connections 10 join each remote station RS to the central, station CS. There is a two-way voice communicator 12 between the central station CS and each remote station RS. Each remote station RS includes at least one video camera VC for sending visual data about a visitor V at the remote station RS to a display D at the control station CS and at least one video monitor VM for displaying at least part of the visual data to the visitor V. The central station CS includes a first database DB1 for storing the visual data sent from the remote station RS and a second database DB2 for looking up historical data abut the visitor V. The remote station RS includes a second video camera VC2 for viewing a rear of a vehicle occupied by the visitor V and a license plate thereon. The remote station RS further includes a printer P for printing out directions and/or a map for the visitor V. The central station CS further includes a facsimile F for sending a video of a breach of security to a police station PS. The system also has a back-up electrical power supply E integrated at each remote station RS to provide protection from lightening strikes and power outages. A battery back-up pack B is provided to open the gate G automatically in the event of an area electrical grid crash.

Where the central station CS includes a first database DB1 configured to store the data sent from the remote station RS, video is automatically sent to the central station CS by a signal sent from a loop detector (not shown). This same signal also automatically captures video and sends it to the first database DB1 for history. The central station CS also has the option to retake the capture which then updates the historical database DB2 for future identification comparison.

Where the remote station RS includes a second video camera VC2 configured to view a rear of a vehicle occupied by the visitor V and a license plate thereon, video capture is automatically sent to the first database DB1 for a history of the rear of the vehicle to show the license plate. This capture is taken when the vehicle departs the loop detector (not shown). This loop detector sends a signal to take the capture and then sends the capture to the first database DB1. Another feature of the capture is that all information is date-stamped and stored in the first database DB1 as to when the vehicle arrived at the gated community and how long the actual transaction took to get through the gate G. This is all done by the signal from the loop detector (not shown). A report can be generated by the central station CS to show who came in the gate G, who was denied entry, when they arrived, the destination, and the vehicle identification. The report also shows whether the destination was contacted via telephone by the central station CS through the use of telephony which records a telephone record in the first database DB1.

The access security system of the present invention may find particular application in controlling access into gated communities. In its basic form, the present invention can replace a guard at the entrance to a gated community with a computer-controlled entry system in which a plurality of gated communities can be controlled from one central monitoring station. Such a structure is essentially a hub-and-spoke system in which controlled kiosks (i.e. the ends of the spokes) are provided at respective gated communities which connect with a central monitoring station (i.e. the hub). With such a security access system, entrance into a gated community can be controlled by operators remotely located at the central monitoring station via computer-based data management and video conferencing software. A remote operator at the central monitoring station can have the ability to select viewing from multiple cameras at each individual kiosk in order to capture and store pictures of visitors and their vehicles, control the operation of a visitor gate, look up registered guests in a community database, use computer-based telephony to call community residents, and perform any other functions to promote security at the entrance to the gated community.

As a general overview, a control system at the kiosk can view each visitor's request to enter the community as an individual transaction. The general flow of this transaction is as follows. A visitor arrives at the remote kiosk and can be viewed by an operator at the central monitoring station by a video image transmitted from remote cameras positioned at the kiosk. The operator at the central station can welcome the visitor and request information as to the visitor's destination and name. The operator can then perform a database query to determine whether the visitor is a registered guest. Also, the operator can call a resident for access approval for unregistered guests. The operator can then send an open gate function command to the gate at the kiosk to allow the visitor to enter the community, or can deny the visitor access.

Furthermore, the communications between the operator and the visitor can also be recorded and stored in a database, e.g. recorded on a computer disk. The result of such a transaction may be the storage in a transaction database of multiple (e.g., two) frames of video, such as a video image of the face of the visitor and a video image of the rear of the visitor's vehicle to view a license plate. This data can then be stored along with the guest's name and the name of the stated resident which the guest is visiting, as well as a time date stamp and an admittance or denial status. In short, along with the multiple frames of video data, other data input by the operator at the central monitoring station can be stored in a transaction database. This operation provides a complete record of a visitor admittance.

As noted above, the structure of the present invention can be viewed as a hub-and-spoke system in which the central monitoring station is the hub. A private network can connect the remote communities, at the kiosks, with the host systems located at the central monitoring station. The physical layout of such a private network supports currently available wide area technologies, including dial-up and cable modem connections, which join the communities to a high-speed local area network (LAN). The host systems at the central monitoring station may be connected directly to the LAN and communicate with the remote systems by, for example, a TCP/IP protocol.

The operator at the central monitoring station will utilize the host systems to communicate with the remote systems, i.e., the kiosks. The audio-visual component of the communication may be accomplished by way of video conferencing software which will allow the operator to view the arrival of a visitor at one of the monitored communities and to allow for two-way audio communication. The control of peripheral devices at the kiosks may be accomplished by sending and receiving command packets between the central monitoring station and the kiosks.

Furthermore, for each community, a database of property owners and registered guests can be stored. The operator can then validate every request for entry into the community by accessing such a database. Each residence or physical property may, for example, be assigned a four-digit property identification number or PIN. Such a PIN may be used quickly to access records of the registered residents and guests. The system may also be designed to provide an operator with the ability to perform alphabetical look-ups by last name, Each community may also have a transaction database where records for each visitor are kept for a certain period of time, for example, two weeks. Such a database will provide the ability to produce numerous reports customized to the needs of a community and special conditions as they occur. With such a database, reports can be created which may include community arrival rates, employee arrivals, arrivals over a certain period of time, or individual arrivals with a picture of the visitor and a picture of the vehicle and its license plate. Obviously, other reports could also be generated. As noted above, kiosks can be placed at entrances to communities in place of guard stations. Thus, the communication lines to the kiosks represent the spokes of the hub-and-spoke system. Such kiosks may be of a structure designed to blend into existing community designs. The kiosks may house a computer and a majority of peripheral components. Such a computer can, as one example, be an IBM-compatible system running a Microsoft Windows Operating System, although other computers with other operating systems could clearly be utilized. The computer in each kiosk should be able to run a hidden remote type of program which would be responsible for maintaining a network connection to the central monitoring station and which can control the peripheral components in response to commands from the central monitoring station. Alternatively, the hidden remote program may be generated at the kiosk. This program functions so as to call the central monitoring station initially to establish network connections therewith, to start video conferencing software, to accept network connection commands, to report current device settings (such as camera contrast and brightness, microphone and speaker volume), to change a selected camera, to change device settings, to open a visitor gate, to place the gate in an unattended mode in response to a loss of connection or a command function, and to send video data to a host. Of course, other functions can also be performed for the gated community.

The kiosk may also include components such as a line monitoring device which restarts a computer when a network connection fails, a video monitoring device which shows to the visitors that they are on camera, a weatherproof speaker, a microphone, video cameras (for example, one video camera which views a face of a visitor and a second video camera which views the rear of the vehicle and its license plate), programmable relays with DTMF tone interface, cooling fans, area lighting, and the like.

The host system located at the central monitoring system may also be an IBM-compatible computer running a Microsoft Windows Operating System Software, although other computers with other software can be utilized. Such a host computer system is designed to allow monitoring of multiple remote communities on a single host system. Such a host system may, for example, have an active audio/visual connection with one site while maintaining a video-only connection with other monitored sites. The operator at the host system can in such circumstances switch the audio/visual connection to any of the other monitored sites and can control the remote peripheral devices at each of the individual kiosks, for example, while connected with the full audio/visual system.

As noted above, one of the features at the kiosk may be a video monitor which shows to the visitor that he or she is on camera. More specifically, this operation may be executed such that when a visitor arrives at the kiosk, the guest is greeted via a speaker at the kiosk by a message from the operator at the central monitoring station. Such a message may be:

"Hello, how may I help you?" At this instant, the visitors can see on the video monitor at the kiosk a small picture of themselves. Thus, the visitors will immediately realize that they are on camera. As noted above, this video data may be automatically stored in a computer at the central monitoring station for subsequent retrieval, if desired, with a time date stamp. The visitors can then be asked by the operator the name of the resident they wish to see. The resident's name may then be brought up on a computer at the central monitoring station and any instructions provided by the resident which are stored in the computer at the central monitoring station can be followed. The visitors can then be told by the operator at the central monitoring station to proceed through the gate with caution or that entry has been denied.

Such an operation also allows the operator to provide directions to the visitor. For that purpose, the kiosk may also include a small printer which can print out directions or a small map, if desired. In this case, the visitor could simply take the printed directions. As the car passes through the gate, another picture can be taken of the license plate of the vehicle and can also be saved along with the driver's picture.

With such an operation, the remote access security system is largely transparent to visitors except for the fact that visitors will immediately realize that they are on camera by seeing themselves on a monitor mounted at the kiosk. However, this aspect of the invention will provide an indication to the visitors that the security system is in place and will act as a deterrent mechanism. Any breach of security can be caught by the video cameras at the kiosk. Thus, a full video of a breach, for example, a picture of the person, the car and the license plate, can be sent via facsimile simultaneously to police as needed. Any security breaches can also be communicated by cellular phone or a landline phone to the operator at the central monitoring station or to any roving security personnel which may have been employed.

The video conferencing communication between the central monitoring station and the kiosks may utilize 32-bit microprocessor technology and high-speed transmissions over standard wide area communication technologies, including analog and digital as well as broad band modems; to link remote kiosk sites to a host computer at the central monitoring station. The central monitoring station network of host computers may be designed to service simultaneously a virtually unlimited number of remote sites. Furthermore, one operator at the central monitoring station can greet, screen, grant/deny access, capture video records of guests, and open a gate for several communities, to maximize efficiency and reduce costs.

Additionally, the mechanical hardware and software components of the remote equipment at the kiosks may be made rugged so as to withstand hostile operating environments such as extreme temperatures, rain, and humidity. Back-up power supplies, integrated at the remote sites, can also provide protection from lightening strikes and power outages.

The overall computer system can also be designed to have automated responses to equipment failures and to employ diagnostics to identify system/component malfunctions so as to allow repair and replacement with back-up component modules. A battery back-up system can also be provided to open gates automatically (for example, for area electric grid crashes) within minutes. Guard personnel can then be dispatched immediately to physically stand guard at the kiosk until any power or equipment failure is resolved.

The present invention as described above has focused on controlling access to gated communities. However, it can also be applied to other situations, such as controlling access to apartment dwellings, luxury high-rise buildings, and the like.

In this way, the present invention provides several advantages. For example, it provides a greatly enhanced security service to gated communities and luxury high-rise buildings at reduced costs over traditional guard services. Another advantage is that the system is composed of high-end microcomputer sub-systems, coupled with custom and off-the-shelf database and video conferencing software to monitor and control community access through a visitor gate.

With the present invention, a traditional guard and guardhouse at the entrance to a gated community can be replaced by a small kiosk. The kiosk can house a computer with associated audio/video communication equipment that is linked via wide area communication technologies, including analog and digital as well as broad band modems, to a host computer at a central monitoring station. At the central monitoring station, the operator views and speaks with a resident or guest via a linkage established between the host and remote computers, grants or denies access, and, as required, notifies the resident of a guest's arrival. Any breaches of the system can be communicated via cellular phone, facsimile, or the like, to any roving guards or police.

Logically, the present invention can be viewed as a hub-and-spoke system, with the central monitoring station serving as the hub of all activities and the kiosk sites located at the ends of the spokes. At the central monitoring station, a network of computers serves general and specialized functions. Community-specific databases containing both resident-supplied information and historical data can be maintained. The resident database can contain both static and dynamic information. For each residence, some of the static information can include the names of all individuals living there, personal identification number (PIN), address, phone number, an optional list of frequent guests, and an indication whether the resident wishes to be notified of a guest's arrival. The dynamic information will have a short life span and can include pre-notification of an unlisted guest's imminent arrival. The historical data is a record of every transaction: name of guest, arrival time, pictures, and whether access was granted. All database information is available for looking-up, updating, and reporting.

Two of the benefits of such a system to the gated communities over guard services are more favorable pricing and a higher level of service. In other words, such a system provides a significant cost reduction and better service over traditional guard personnel.

The service benefits are threefold. First, storage and retrieval of resident and guest information from a computer database makes for fast and complete response to access requests. This feature translates into more effective administration, control and reporting of guest activity. Second, only a centralized staff is required and will bring a higher level of technical and customer service skills with a greater level of professionalism to dealings with residents and guests. Third, staff centralization improves the level of training, monitoring and controlling of employee courtesy, responsiveness and timeliness. All of these factors lead to heightened benefits of such a system.

Obviously, numerous additional modifications and variations of the present invention are possible in light of the above teachings. It is therefore to be understood that, within the scope of the appended claims, the present invention may be practiced otherwise than as specifically described herein.

What is claimed:

1. An access security system for a gate of a gated community, said system comprising:
　at least one remote station configured to control access past the gate of the gated community;
　a central station configured to monitor the at least one remote station and also configured to control the at least one remote station as to access past the gate;
　dial-up and cable modem connections configured to join the at least one remote station to the central station; and
　a two-way voice communicator connected between the central station and the at least one remote station;
　wherein the at least one remote station includes at least one video camera arranged to send visual data about a visitor at the remote station to a display at the central station and also includes at least one video monitor arranged to display at least part of the visual data to the visitor;

wherein the central station includes a first database configured to store the visual data sent from the at least one remote station and also includes a second database configured to look up historical data about the visitor; and wherein said at least one remote station further includes a printer configured to print out directions and/or a map for the visitor.

2. An access security system according to claim 1; wherein: said at least one remote station further includes a second video camera configured to view a rear of a vehicle occupied by the visitor and a license plate thereon.

3. An access security system according to claim 1, wherein:

said central station further includes a facsimile configured to send a video of a breach of security to a police station.

4. An access security system according to claim 1, further comprising:

a back-up power supply integrated at the at least one remote station and configured to provide protection from lightening strikes and power outages.

5. An access security system according to claim 1, further comprising:

a battery back-up pack provided to open the gate automatically in the event of an area electric grid crash.

* * * * *